Nov. 29, 1960  C. P. TYLER  2,962,432
POLAROGRAPHIC APPARATUS
Filed June 14, 1957  2 Sheets-Sheet 1

INVENTOR.
CARL P. TYLER,
BY
Frank S. Troidl
ATTORNEY.

Nov. 29, 1960  C. P. TYLER  2,962,432
POLAROGRAPHIC APPARATUS

Filed June 14, 1957  2 Sheets-Sheet 2

INVENTOR.
CARL P. TYLER,
BY Frank S. Troidl
ATTORNEY.

United States Patent Office 2,962,432
Patented Nov. 29, 1960

2,962,432

POLAROGRAPHIC APPARATUS

Carl P. Tyler, Harris County, Tex., assignor, by mesne assignments, to Esso Research and Engineering Company, Elizabeth, N.J., a corporation of Delaware Filed June 14, 1957, Ser. No. 665,851

8 Claims. (Cl. 204—195)

This invention relates to polarographic apparatus. More particularly, the invention relates to a polarographic apparatus which is portable and particularly adapted for measuring the amount of dissolved oxygen in industrial and natural waters.

The determination of the oxygen content of industrial and natural waters is very important. This is because the oxygen content gives an indication of the pollution of the waters. The polluting materials use up the oxygen, therefore, a small amount of dissolved oxygen in the waters indicates the water is highly polluted.

Current polarographic devices do not give an accurate indication of the amount of dissolved oxygen in the waters except under ideal conditions in the laboratory. Often, in order to obtain an accurate indication of the amount of dissolved oxygen in water, the polarographic apparatus should be used in the field. If the sample obtained from the field is brought back to the laboratory where the oxygen content is determined, the indicated oxygen content may not be the actual oxygen content of the water at the time the sample is taken in the field. In current polarographic devices used in the field and utilizing a dropping mercury electrode which consists of mercury which is extruded from a capillary in the form of drops, the mercury drops vary from its smallest area, which occurs as the drop first starts to develop, to its largest area, which occurs just prior to the time at which the mercury drops from the capillary tube. This mercury drop "build up" is not objectionable as long as it occurs with a definite regularity. In the laboratory under quiet conditions, this regularity is easily attained, whereas, in the field it would be disrupted by vibration or other movement creating spurious readings.

Another disadvantage of current polarographic devices is that their structure is that it is impossible to obtain an indication of the amount of dissolved oxygen in a continuously flowing sample. Current devices require that a stationary sample be used.

A polarographic device which can be used both in the laboratory and in the field, is not subject to false readings due to mercury drop oscillations, and can be used for obtaining an accurate reading on a flowing sample as well as a stationary sample, is highly desirable. My new polarographic device fulfills all of these requirements.

Briefly described, my new polarographic apparatus includes a vessel which is partially filled with mercury. A side arm is connected to the vessel. When used in the laboratory, the fluid to be tested is contained within the side arm and the vessel. When used in the field, a flexible tubing may be attached to the side arm for feeding a continuous flow of fluid through the side arm, vessel, and a fluid flow outlet forming a part of the vessel. A capillary tube is connected to the side arm and forms an angle therewith. The angular positioning of the capillary tube and the side arm permits the flowing fluids to shear off the dropping mercury before they reach full size. This prevents oscillations of the mercury drops. A mercury reservoir is connected to the capillary tube so that drops of mercury flow through the capillary tube, the side arm, and into the vessel. A conductive lead extends into the mercury contained within the vessel and a conductive lead extends into the mercury in the reservoir. An electric circuit is connected to the leads. This electric circuit includes an adjustable electromotive force for applying a voltage across the electrodes and also includes means for measuring the current flow through the fluid tested.

Referring to the drawings in which.

Figure 1:
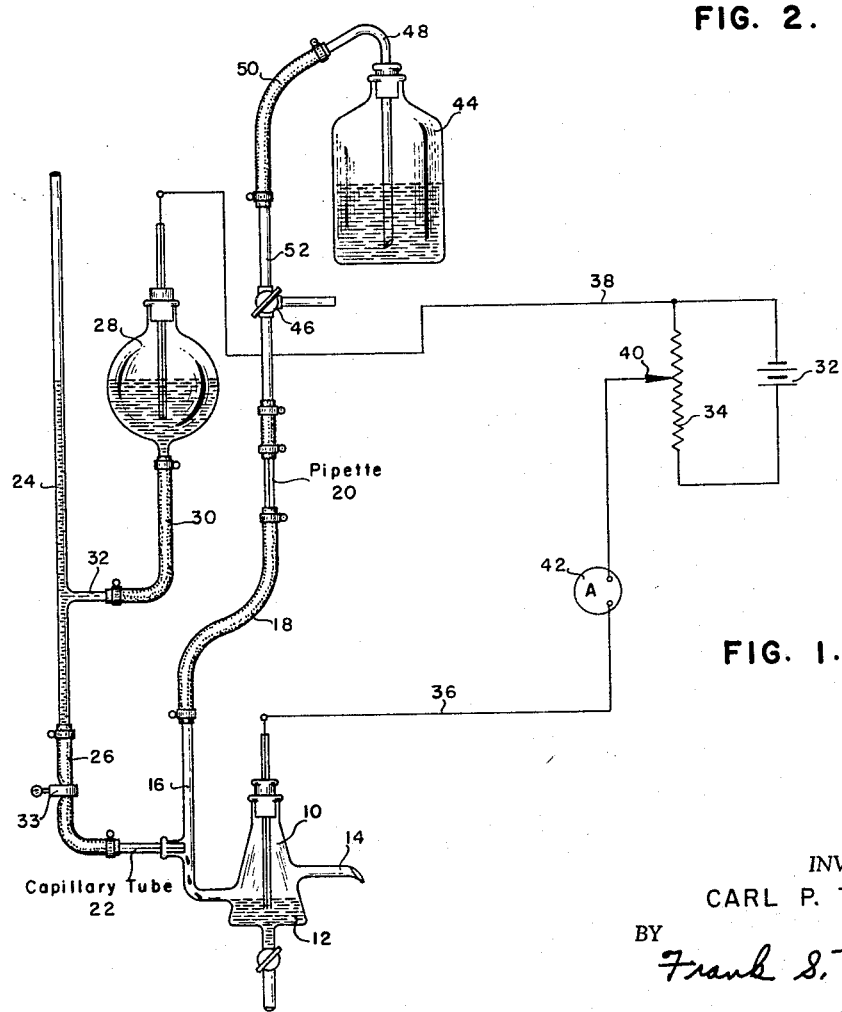
Fig. 1 is a schematic diagram showing a preferred embodiment of the polarographic apparatus.

Referring to Fig. 1, a vessel 10 is shown which is partially filled with mercury 12. Vessel 10 may be provided with a side arm 14 providing a fluid flow outlet. A second side arm 16 is provided and is integrally connected to the vessel 10. This side arm 16 is hollow and preferably L-shaped.

The horizontal portion of side arm 16 terminates at a point on vessel 10 above the level of the mercury 12 within the vessel to permit sample flow into vessel 10, over mercury 12, and out fluid flow outlet 14.

Flexible tubing 18 is attached to the vertical portion of L-shaped side arm 16. The flexible tubing 18, L-shaped member 16, vessel 10, and fluid outlet 14 provide a continuous path for the flow of the sample to be tested. The rate of flow of the sample is controlled by means of a pipette 20 inserted in the upper end of tubing 18.

A capillary tube 22 is connected to the side arm member 16. This capillary tube is preferably attached to the vertical portion of the L-shaped side arm 16. It is necessary for the best operation of my new device that capillary tube 22 and side arm to be at an angle with one another. This angle may be approximately a right angle. In the embodiment shown, the edge of the capillary tube 22 is positioned to permit the sample to flow easily past the edge of the capillary tube and knock off the mercury drops before they reach full size.

A vertically-extending tube 24 is connected to capillary tube 22 through a flexible rubber or plastic tube 26. To provide a mercury head to capillary tube 22, a mercury reservoir 28 is disposed at a predetermined level about the capillary tube 22. The reservoir 28 is connected to the capillary tube by means of a flexible tube 30, side arm 32, tube 24, and flexible tube 26. A screw clamp 33 for stopping mercury flow is mounted about flexible tube 26.

This arrangement provides for the rapid dropping of the mercury electrode which is controlled within a satisfactory range by (1) the height of the mercury reservoir 28 above the tube 22, (2) the size of the capillary opening in the tube 22, (3) the horizontal position of the tube 22 in the apparatus, and (4) the flow of sample past the end of the electrode 22 and at an angle to it to shear off the mercury drops before they reach full size. This eliminates the effect of vibration, a limiting factor in portable equipment and one which cannot be tolerated with the conventional dropping mercury electrode. Mercury drops of greater than 200 per minute are easily obtained.

A battery 32 has its positive terminal connected by means of a potentiometer 34 to conductive lead 36 which extends into the mercury 12 in the vessel 10. The negative terminal of battery 32 is connected to a lead 38 which extends into the mercury in the reservoir 28. Hence, an electrical voltage is established across the mercury drops between tube 22 and the mercury 12.

The movable arm 40 of the potentiometer is used to control the voltage across the polarographic cell formed by tube 22, the mercury drops, and the mercury 12. The current flow through the fluid sample under test is indicated by means such as an ammeter 42 in series with the leads 38 and 36. If no electrolyte occurs naturally in the fluid tested, an electrolyte such as KCl should be added to the sample.

When used in the laboratory and with a stationary sample, the sample is contained within the side arm 16 and vessel 10. When used in the field, the water to be tested may be siphoned directly through tubing 18, side arm 16, vessel 10, and fluid outlet 14 to provide a continuous flow of fluid and continuous measurements of dissolved oxygen within the fluid. In the alternative, the fluid to be tested can be placed in a flask 44 and siphoned by means of a three-way stopcock 46 for siphoning the sample through a siphoning tube 48, rubber or plastic tube 50, and tube 52 into the tube 18.

In the use of a polarographic cell, the typical current-voltage curve in which the applied E.M.F. is plotted as the abscissa and the corresponding current as the ordinate, shows that the current increases as the voltage across the cell is increased. The current, however, does not increase indefinitely with increasing applied E.M.F., but approaches a limiting value. Other factors being constant, the limiting current is directly proportional to the amount of dissolved oxygen in the sample under test, thereby affording a quantitative analysis of the sample.

Figure 2:
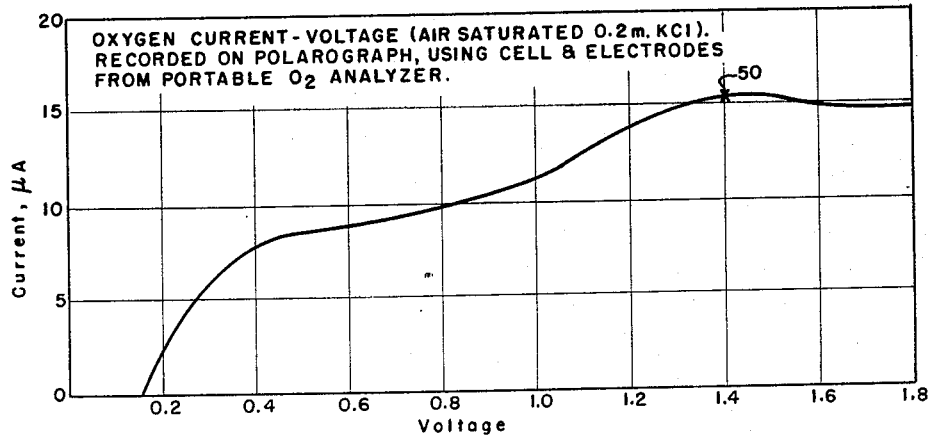
Fig. 2 is a graph showing the voltage-current relationship of readings taken on an air-saturated 0.2 molar KCl solution.

Fig. 2 shows a current-voltage curve obtained using my new apparatus on an air-saturated 0.2 molar KCl solution. An inspection of the curve shows that as the voltage across the cell is increased, the current increases, reaching a limiting value at point 50, which occurs at a voltage of approximately 1.4. Therefore, if a voltage of at least 1.4 is applied across the cell by adjustment of the tap 40 along resistance 34 (see Fig. 1), the current flow through the cell will be proportional to the amount of dissolved oxygen in the sample.

The current produced by the reduction of oxygen at the mercury electrode when the voltage is about 1.4 volts, or greater, must be corrected for variations in temperature and also corrected for residual current, i.e., the current through the sample with no oxygen therein.

Figure 3:
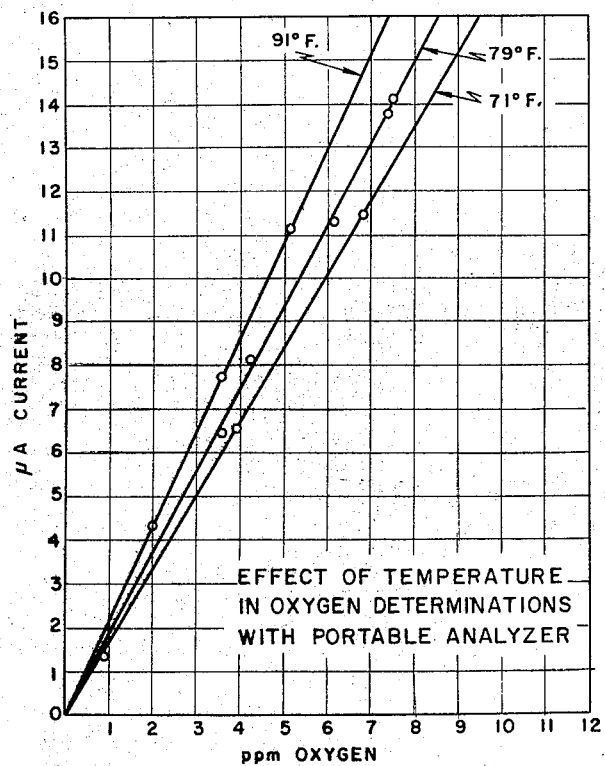
Fig. 3 is a graph taken with a voltage across the electrodes of 1.4 volts and showing the effects of temperature upon the readings.

Fig. 3 shows in graphical form a current-p.p.m. oxygen graph taken at temperatures of 71° F., 79° F., and 91° F., with an E.M.F. of 1.4 volts and corrected for residual current. It is seen from an examination of Fig. 3 that at higher temperatures the current reading increases for the same amount of dissolved oxygen in the sample. It can also be seen from Fig. 3 that the current is a linear function of the dissolved oxygen.

Using the room temperature 79° F. as a standard temperature, a temperature correction factor can be obtained from Fig. 3 by use of the formula:

(1)
$$\frac{i_{obs.}}{a(T_{obs.}-T_{std.})+1}=i_{std.}$$

where $i_{obs.}$ = the observed current
$T_{obs.}$ = the observed temperature
$T_{std.}$ = the standard temperature
$i_{std.}$ = the current at standard temperature by solving for "$a$," a value of 0.012 is obtained, which, when substituted into the above formula, serves, as a factor for correcting the current of an unknown sample to the standard temperature.

Figure 4:
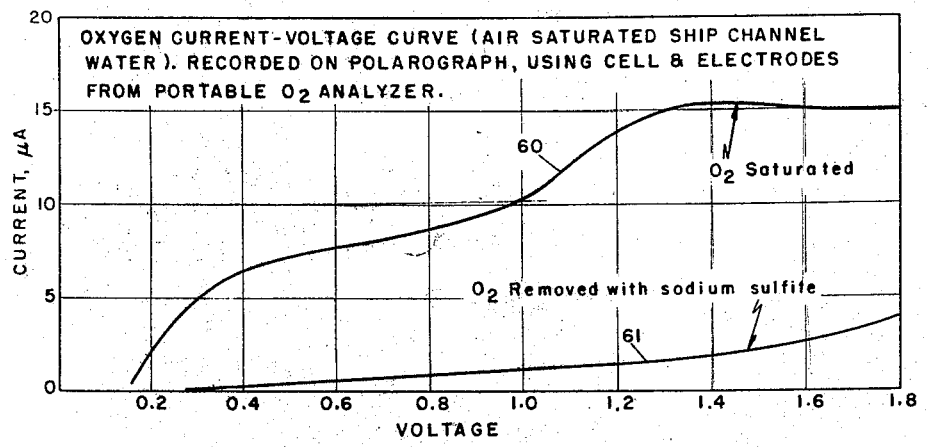
Fig. 4 is a current-voltage graph of readings taken with oxygen-saturated ship channel water, and readings taken with the oxygen removed from the ship channel water.

The correction for residual current may be obtained by use of the current-voltage graphs shown in Fig. 4. These graphs were obtained by my new polarographic apparatus on a sample of air-saturated ship channel water. Curve 60 is the current-voltage curve for the air-saturated water and curve 61 shows the current-voltage relationship with the oxygen removed from the water with sodium sulfite. Curve 61 represents the residual current. The amount of dissolved oxygen in samples of water therafter obtained from the ship channel can be calculated by means of the formula:

(2)
$$\left[\left(\frac{i_{obs.}}{.012(T_{obs.}-T_{std.})+1}\right)-i_{res.}\right]$$
$\times F.$ = p.p.m. dissolved oxygen where $i_{res.}$ = the residual current
$F$ = the calibration factor For best results the calibration should be made under conditions approximately those under which the samples are to be run. The net current is obtained by subtracting the residual current from the observed current through a solution of known oxygen content with corrections made for temperature. The p.p.m. dissolved oxygen divided by the net current gives the calibration factor "F."

It is seen, therefore, that I have invented a new polarographic apparatus which can be adapted for both laboratory and field use, and does not produce false readings due to vibrations of the dropping mercury and may be used for obtaining a continuously flowing sample. In laboratory use of the instrument, a slower drop-time may be desirable; however, in field use, a faster drop-time probably will be necessary to counteract vibration. The range through which the drop time can be varied is limited by the size of the opening in the electrode.

Although the present description has pointed out the use of this instrument in determining the amount of dissolved oxygen in industrial and natural waters, it is to be understood that the instrument may be used for all other uses of polarographic cells and in testing solutions for substances other than oxygen.

What is claimed is:

1. A polarographic apparatus comprising: a vessel partially filled with mercury and having a fluid flow outlet; a side arm connected to the vessel; flexible tubing attached to the side arm, the tubing, side arm, vessel and its fluid flow outlet serving as a continuous fluid flow path; a capillary tube connected to the side arm the axis of the capillary tube forming an angle of approximately a right angle with the axis of the side arm; a mercury reservoir connected to the capillary tube so that drops of mercury flow through the capillary tube, the side arm and into the vessel; a conductive lead extending into the mercury contained in the vessel; a conductive lead extending into the mercury in the reservoir; and an electrical circuit connected to the leads, including an adjustable electromotive force and means for measuring the current flow through the fluid.

2. A polarographic apparatus in accordance with claim 1 wherein the side arm is substantially L-shaped and the capillary tube is connected to its vertical portion.

3. A portable polarographic apparatus for use in determining the amount of dissolved oxygen in a fluid comprising: a vessel partially filled with mercury and having a fluid flow outlet; a hollow side arm connected to the vessel terminating at a point above the level of the mercury in the vessel; flexible tubing attached to the side arm, the tubing, side arm, vessel and its fluid flow outlet serving as a continuous fluid flow path; a pipette in the tubing for controlling rate of fluid flow; a capillary tube connected to the side arm the axis of the capillary tube forming an angle of approximately a right angle with the axis of the side arm; vertically-extended tubing connected to the capillary tubing; a mercury reservoir connected to the tubing and disposed at a predetermined point to provide a head of mercury to the capillary tube so that drops of mercury flow from the capillary tube through the side arm and into the vessel; valve means for drawing off mercury from the vessel to maintain the mercury in the vessel at a substantially constant level; a battery having its positive terminal connected to a conductive lead extending into the mercury contained in the vessel and its negative terminal connected to a conductive lead extending into the mercury in the reservoir; a potentiometer connected across the battery with its movable arm connected to the conductive lead to the mercury in the vessel, thus providing means for adjusting the voltage between the mercury in the vessel and the mercury in the capillary tube; and means for indicating the current through the fluid.

4. A portable polarographic apparatus for use in determining the amount of dissolved oxygen in a fluid comprising: a vessel partially filled with mercury and having a fluid flow outlet; a hollow L-shaped member integrally connected to the vessel with the horizontal portion terminating at a point just above the level of the mercury in the vessel; flexible tubing attached to the vertical portion of the L-shaped member, the tubing, L-shaped member, vessel and its fluid flow outlet serving as a continuous fluid flow path; a pipette in the tubing for controlling the rate of fluid flow; a capillary tube connected to the vertical portion of the L-shaped member and forming a right angle therewith; vertically-extending tubing connected to the capillary tubing; a mercury reservoir connected to the tubing and disposed at a predetermined point above the capillary tube to provide a head of mercury to the capillary tube so that drops of mercury flow from the capillary tube down the L-shaped member and into the vessel; valve means for drawing off mercury from the vessel to maintain the mercury in the vessel at a substantially constant level; a battery having its positive terminal connected to a conductive lead extending into the mercury contained in the vessel and its negative terminal connected to a conductive lead extending into the mercury in the reservoir; a potentiometer connected across the battery with its movable arm connected to the conductive lead to the mercury in the vessel, thus providing means for adjusting the voltage between the mercury in the vessel and the mercury in the capillary tube; and an ammeter in series with the leads and potentiometer.

5. A polarographic apparatus comprising: a vessel partially filled with mercury; fluid flow means connected to the vessel to permit a flow of fluid through the vessel; a mercury reservoir; a capillary tube connected to the mercury reservoir so that drops of mercury flow through the capillary tube, the capillary tube also being connected to the vessel so that the flow of fluid is at an angle of approximately a right angle to the capillary tube exit; a conductive lead extending into the mercury contained in the vessel; a conductive lead extending into the mercury in the reservoir; and an electrical circuit connected to the leads, including an adjustable electromotive force and means for measuring the current flow through the fluid.

6. A polarographic apparatus comprising: a vessel partially filled with mercury and having a fluid flow outlet; a fluid conduit attached to the vessel, the conduit, vessel, and its fluid flow outlet serving as a continuous fluid flow path; a capillary tube connected to the vessel and forming an angle of approximately a right angle therewith; a mercury reservoir connected to the capillary tube so that drops of mercury flow through the capillary tube and into the vessel; a conductive lead extending into the mercury contained in the vessel; a conductive lead extending into the mercury in the reservoir; and an electrical circuit connected to the leads, including an adjustable electromotive force and means for measuring the current flow through the fluid.

7. A portable polarographic apparatus for use in determining the amount of dissolved oxygen in a fluid comprising: a vessel partially filled with mercury and having a fluid flow outlet; flexible tubing attached to the vessel, the tubing, vessel and its fluid flow outlet serving as a continuous fluid flow path; a pipette in the tubing for controlling rate of fluid flow; a capillary tube connected to the vessel and forming an angle of approximately a right angle therewith; vertically-extended tubing connected to the capillary tubing; a mercury reservoir connected to the tubing and disposed at a predetermined point to provide a head of mercury to the capillary tube so that drops of mercury flow from the capillary tube and into the vessel; valve means for drawing off mercury from the vessel to maintain the mercury in the vessel at a substantially constant level; a battery having its positive terminal connected to a conductive lead extending into the mercury contained in the vessel and its negative terminal connected to a conductive lead extending into the mercury in the reservoir; a potentiometer connected across the battery with its movable arm connected to the conductive lead to the mercury in the vessel, thus providing means for adjusting the voltage between the mercury in the vessel and the mercury in the capillary tube; and means for indicating the current through the fluid.

8. A polarographic apparatus comprising: a vessel; fluid flow means connected to the vessel to permit a flow of fluid through the vessel; a capillary tube through which mercury can be flowed and caused to flow from the capillary tube exit in discrete droplets, the capillary tube being connected to the vessel so that the flow of fluid is at an angle of approximately a right angle to the capillary tube exit; a conductive lead extending into the vessel; and an electrical circuit connected to the conductive lead and the capillary tube, including an adjustable electromotive force and means for measuring the current flow through the fluid.

References Cited in the file of this patent

UNITED STATES PATENTS 2,500,284     Heyrovsky _____ Mar. 14, 1950

OTHER REFERENCES

Chemical Products, January-February 1944, page 23, article by John T. Stock.